(12) United States Patent
Hwangbo et al.

(10) Patent No.: US 10,744,971 B2
(45) Date of Patent: Aug. 18, 2020

(54) ROOF AIRBAG APPARATUS

(71) Applicant: HYUNDAI MOBIS Co., Ltd., Seoul (KR)

(72) Inventors: Sang Won Hwangbo, Goyang-si (KR); Hae Kwon Park, Yongin-si (KR); Jiwoon Song, Yongin-si (KR); Byung Ho Min, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 125 days.

(21) Appl. No.: 16/158,909

(22) Filed: Oct. 12, 2018

(65) Prior Publication Data
US 2019/0111885 A1 Apr. 18, 2019

(30) Foreign Application Priority Data
Oct. 13, 2017 (KR) ........................ 10-2017-0132900

(51) Int. Cl.
*B60R 21/2338* (2011.01)
*B60R 21/214* (2011.01)
*B60R 21/231* (2011.01)
*B60R 21/16* (2006.01)

(52) U.S. Cl.
CPC ........ *B60R 21/2338* (2013.01); *B60R 21/214* (2013.01); *B60R 2021/161* (2013.01); *B60R 2021/23192* (2013.01); *B60R 2021/23388* (2013.01)

(58) Field of Classification Search
CPC .............. B60R 21/2338; B60R 21/214; B60R 2021/23388; B60R 2021/23192; B60R 2021/161
See application file for complete search history.

(56) References Cited

U.S. PATENT DOCUMENTS

| 6,189,960 | B1* | 2/2001 | Mumura | B60J 7/0015 160/7 |
| 9,016,759 | B2* | 4/2015 | Ricketts | B60R 22/24 296/146.1 |
| 2003/0178832 | A1* | 9/2003 | Dominissini | B60R 21/201 280/743.2 |
| 2005/0134030 | A1* | 6/2005 | Noguchi | B60R 21/213 280/730.2 |
| 2005/0140124 | A1* | 6/2005 | Noguchi | B60R 21/232 280/730.2 |
| 2005/0150125 | A1* | 7/2005 | Hajdukiewicz | G01B 5/012 33/556 |
| 2007/0052212 | A1* | 3/2007 | Powals | B60R 21/213 280/729 |
| 2008/0106083 | A1* | 5/2008 | Walston | B60R 21/08 280/743.2 |
| 2010/0127484 | A1* | 5/2010 | Son | B60R 21/213 280/730.2 |

(Continued)

*Primary Examiner* — Darlene P Condra
(74) *Attorney, Agent, or Firm* — H.C. Park & Associates, PLC

(57) ABSTRACT

A roof airbag apparatus may include: a cushion having an inlet through which gas discharged from an inflator is introduced; a plurality of tethers connected to the cushion, and arranged along the edge of the cushion so as to be separated from each other; a plurality of steel tabs each having a connection hole formed therein; and a tether guide installed in a pillar shape through the connection holes, and supporting the cushion. The tethers may be connected to the cushion through the respective connection holes.

11 Claims, 14 Drawing Sheets

(56) References Cited

U.S. PATENT DOCUMENTS

| | | | |
|---|---|---|---|
| 2012/0001445 A1* | 1/2012 | Hajiri | B60R 13/011 |
| | | | 296/1.08 |
| 2015/0115581 A1* | 4/2015 | Mazanek | B60R 21/2334 |
| | | | 280/730.2 |
| 2018/0162313 A1* | 6/2018 | Lee | B60R 21/2338 |
| 2018/0162314 A1* | 6/2018 | Lee | B60R 21/2338 |
| 2019/0016292 A1* | 1/2019 | Son | B60R 21/214 |

* cited by examiner

ROOF AIRBAG APPARATUS

CROSS-REFERENCE TO RELATED APPLICATION

This application claims priority from and the benefit of Korean Patent Application No. 10-2017-0132900, filed on Oct. 13, 2017, which is hereby incorporated by reference for all purposes as if set forth herein.

BACKGROUND

Field

Exemplary embodiments relate to a roof airbag apparatus, and more particularly, to a roof airbag apparatus which can improve the assembling performance of a cushion and reduce friction caused when the cushion is deployed.

Discussion of the Background

In general, a vehicle has an airbag apparatus to protect a passenger. The airbag apparatus includes an inflator and a cushion. When an external shock of predetermined magnitude or more is applied to a vehicle, the cushion is deployed by gas supplied from the inflator, and thus protects a passenger.

Depending on the specification of a vehicle and a target which needs to be protected, the airbag apparatus may be mounted at predetermined positions of the vehicle, for example, a steering wheel mounted in an instrument panel, the top of a glove box, and an inner side surface of the vehicle.

In particular, a roof airbag apparatus is a kind of airbag apparatus which is mounted at the roof of a vehicle and deployed from the top of a passenger so as to protect the passenger. The roof airbag apparatus includes a plurality of tethers arranged at the edge of a cushion so as to be separated from each other, and a tether guide installed through the plurality of tethers. However, when the cushion is expanded by gas supplied thereto, the movement of the tether guide may be decreased while the space for the tethers is narrowed. Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a roof airbag apparatus which can improve the assembling performance of a cushion and reduce friction caused when the cushion is deployed.

In one embodiment, a roof airbag apparatus may include: a cushion having an inlet through which gas discharged from an inflator is introduced; a plurality of tethers connected to the cushion, and arranged along the edge of the cushion so as to be separated from each other; a plurality of steel tabs each having a connection hole formed therein; and a tether guide installed in a pillar shape through the connection holes, and supporting the cushion. The tethers may be connected to the cushion through the respective connection holes.

The tether may be moved toward the cushion along the connection hole when the cushion is expanded, and pulls the tether guide.

The width of the connection hole in the direction that the tether is moved may be larger than the width of the connection hole in a direction perpendicular to the direction that the tether is moved.

The connection hole may include: a guide hole through which the tether guide is installed; and a tether hole disposed separately from the guide hole and having the tether installed therethrough.

The width of the guide hole in the direction that the tether guide is moved may be larger than the width of the guide hole in a direction perpendicular to the direction that the tether guide is moved.

The width of the tether hole in the direction that the tether is moved may be smaller than the width of the tether hole in a direction perpendicular to the direction that the tether is moved.

The width of the tether hole in the direction perpendicular to the direction that the tether is moved may be equal to the width of the tether.

The tether hole may include: a first tether hole through which the tether is installed; and a second tether hole which communicates with the first tether hole and into which the tether is inserted when the cushion is expanded.

The second tether hole may have a smaller size than the first tether hole.

The second tether hole may be formed in a round shape.

The second tether hole may have protrusions formed toward the inside.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
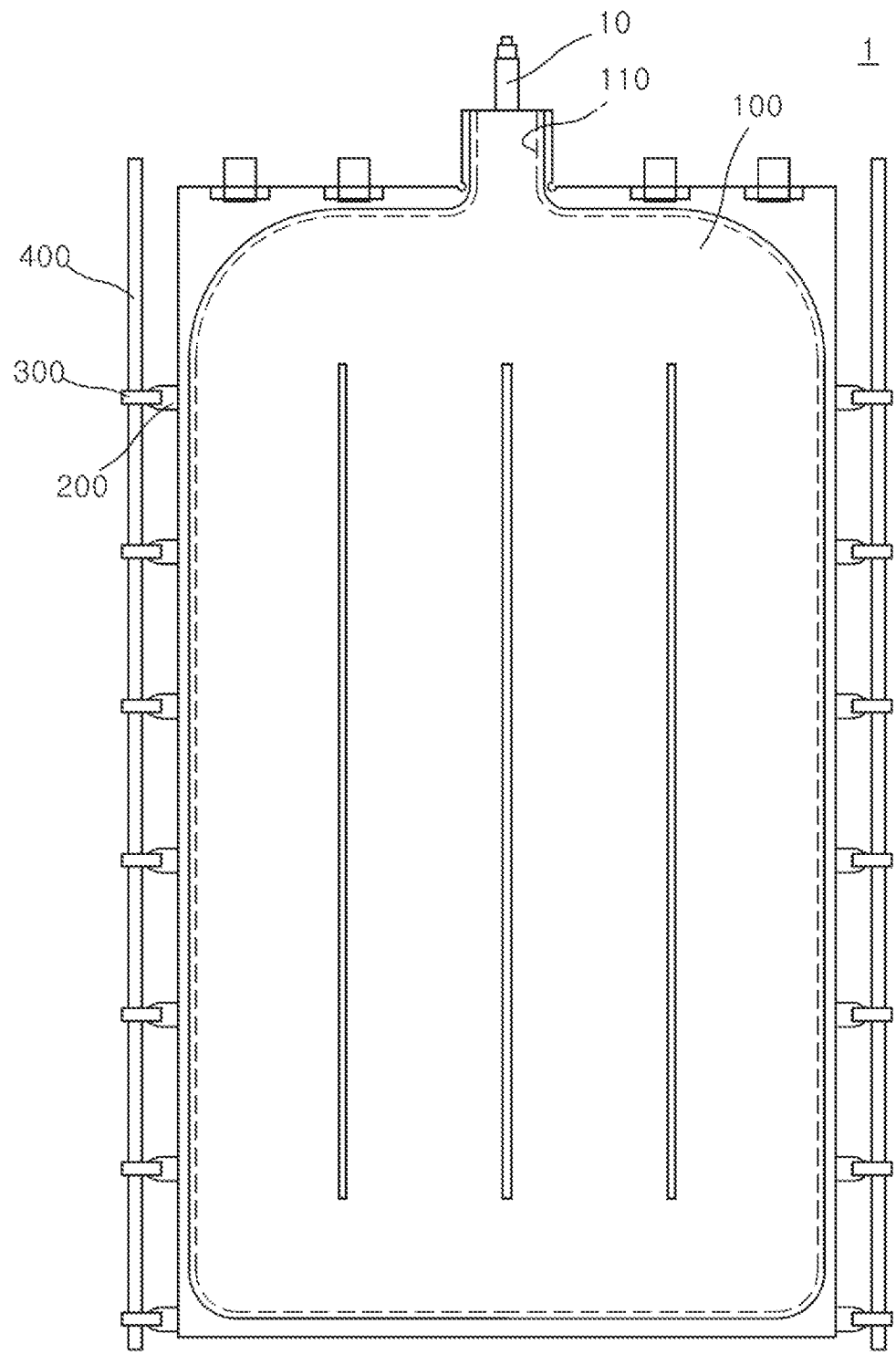
FIG. 1 illustrates a roof airbag apparatus in accordance with a first embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereafter, a roof airbag apparatus in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
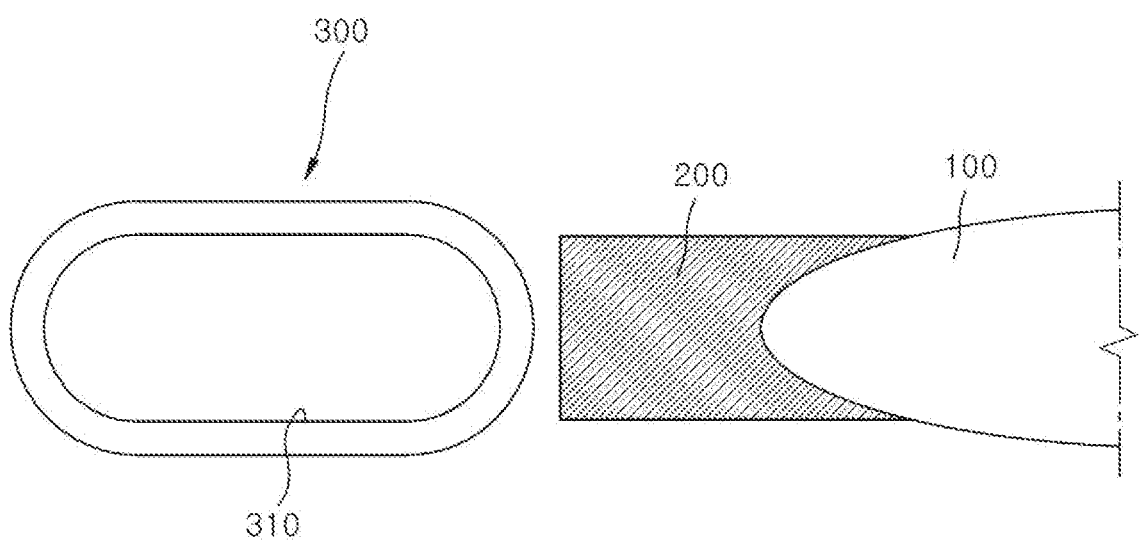
FIG. 2 illustrates a cushion, a tether and a steel tab of the roof airbag apparatus in accordance with the first embodiment of the present invention.
Figure 3:
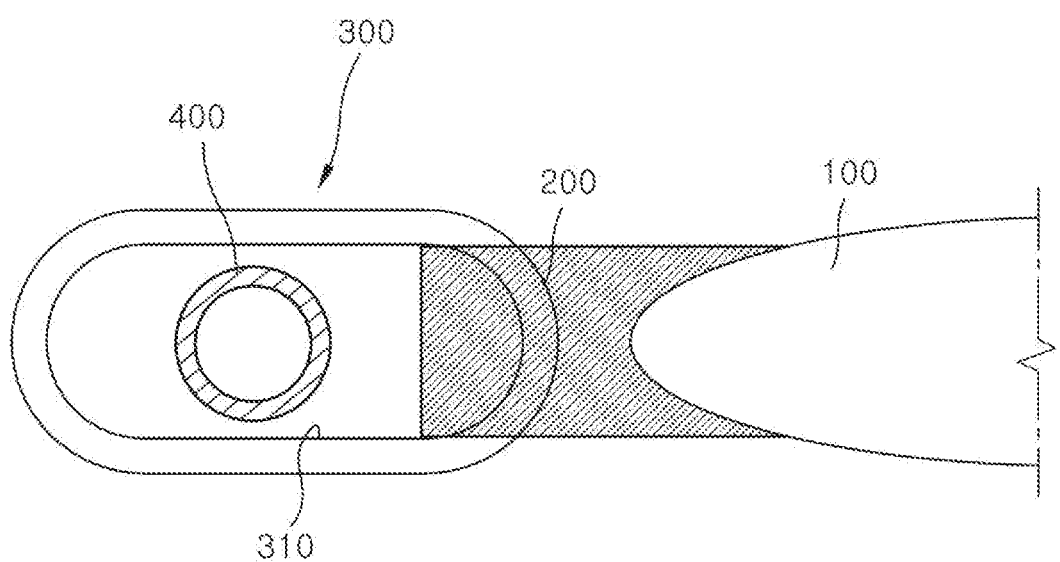
FIG. 3 illustrates that the cushion, the tether, the steel tab and a tether guide of the roof airbag apparatus in accordance with the first embodiment of the present invention are assembled to each other.
Figure 4:
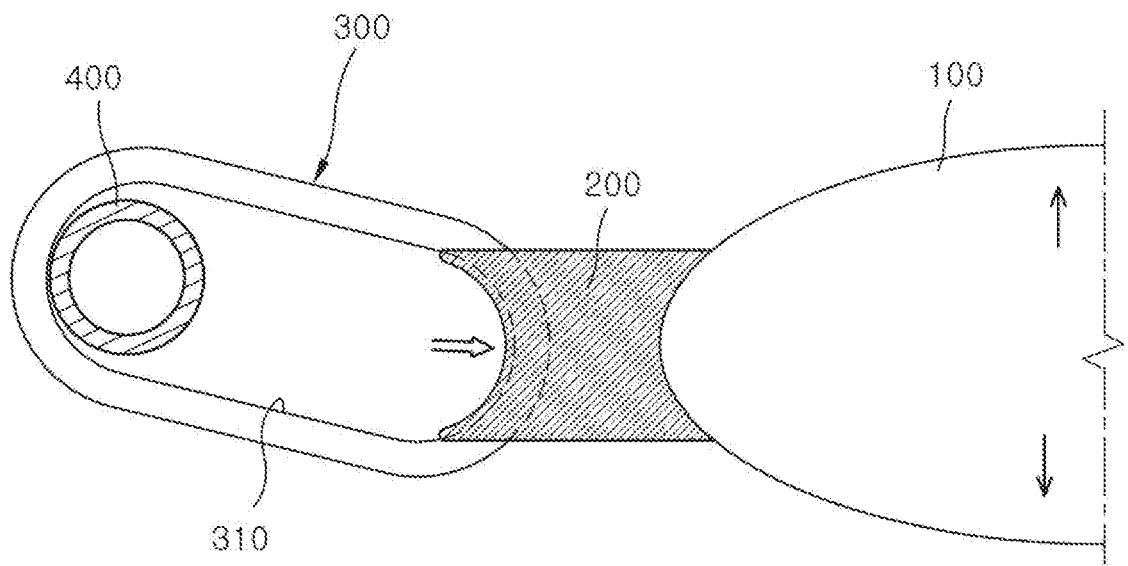
FIG. 4 illustrates that the tether is pulled by expansion of the cushion of the roof airbag apparatus in accordance with the first embodiment of the present invention.

FIG. 1 illustrates a roof airbag apparatus in accordance with a first embodiment of the present invention, FIG. 2 illustrates a cushion, a tether and a steel tab of the roof airbag apparatus in accordance with the first embodiment of the present invention, FIG. 3 illustrates that the cushion, the tether, the steel tab and a tether guide of the roof airbag apparatus in accordance with the first embodiment of the present invention are assembled to each other, and FIG. 4 illustrates that the tether is pulled by expansion of the cushion of the roof airbag apparatus in accordance with the first embodiment of the present invention.

Referring to FIGS. 1 to 4, the roof airbag apparatus 1 in accordance with the present embodiment may include a cushion 100, a plurality of tethers 200, a plurality of steel tabs 300 and a tether guide 400. The cushion 100 may have an inlet 110 through which gas discharged from the inflator 10 is introduced. The cushion 100 may be deployed along the roof (not illustrated) of the vehicle, while forming an air cushion capable of buffering a shock force. The cushion 100 may be horizontally deployed in a shape to cover the bottom of the roof in case of a vehicle accident. Therefore, although the roof is damaged by a shock force applied to the vehicle or a rollover of the vehicle, the cushion 100 can prevent a passenger from being injured by the damaged portion of the roof or thrown to the outside.

The inflator 10 may generate gas in case of a vehicle collision. For example, one or more inflators 10 may be mounted at the top of the vehicle, and arranged in parallel to the widthwise direction of the vehicle. The inflator 10 may be ignited by a sensing signal of a collision sensor (not illustrated), and generate gas. When the gas generated by the inflator 10 is discharged, the gas may be introduced into the cushion 100 through the inlet 110. The cushion 100 may be horizontally expanded from a portion close to the inflator 10, i.e. the rear portion of the cushion 100, and deployed forward along the roof.

The plurality of tethers 200 may be connected to the cushion 100, and arranged along the edge of the cushion 100 so as to be separated from each other. As illustrated in FIG. 1, the plurality of tethers 200 may be arranged at the left and right sides of the cushion 100 in the longitudinal direction of the cushion 100 (based on FIG. 1). At this time, the tethers 200 may be connected to the cushion 100 through connection holes 310 of the respective steel tabs 300. When the cushion 100 is expanded, the tethers 200 may be moved toward the cushion 100 along the connection holes 310 and pull the tether guide 400.

Each of the steel tabs 300 may have the connection hole 310. The width of the connection hole 310 in the direction that the tether 200 is moved may be larger than the width of the connection hole 310 in a direction perpendicular to the direction that the tether 200 is moved. Therefore, when the steel tab 300 is pulled toward the cushion 100 by the expansion of the cushion 100, the tether guide 400 can be prevented from being excessively pulled and bent.

The connection hole 310 may be rounded in the direction perpendicular to the direction that the tether 200 is moved. Thus, it is possible to reduce friction when the tether 200 is moved on the connection hole 310.

The tether guide 400 may be installed in a pillar shape through the connection holes 310, and support the cushion 100. As illustrated in FIG. 4, the tether guide 400 may not be directly connected to the tether 200, but connected to the tether 200 through the steel tab 300. Therefore, when the cushion 100 is expanded, the space for the connection between the tether guide 400 and the cushion 100 can be prevented from being narrowed. Furthermore, the steel tab 300 can be turned by a pulling force when the cushion 100 is expanded, which makes it possible to reduce friction caused when the cushion 100 is deployed.

Figure 5:
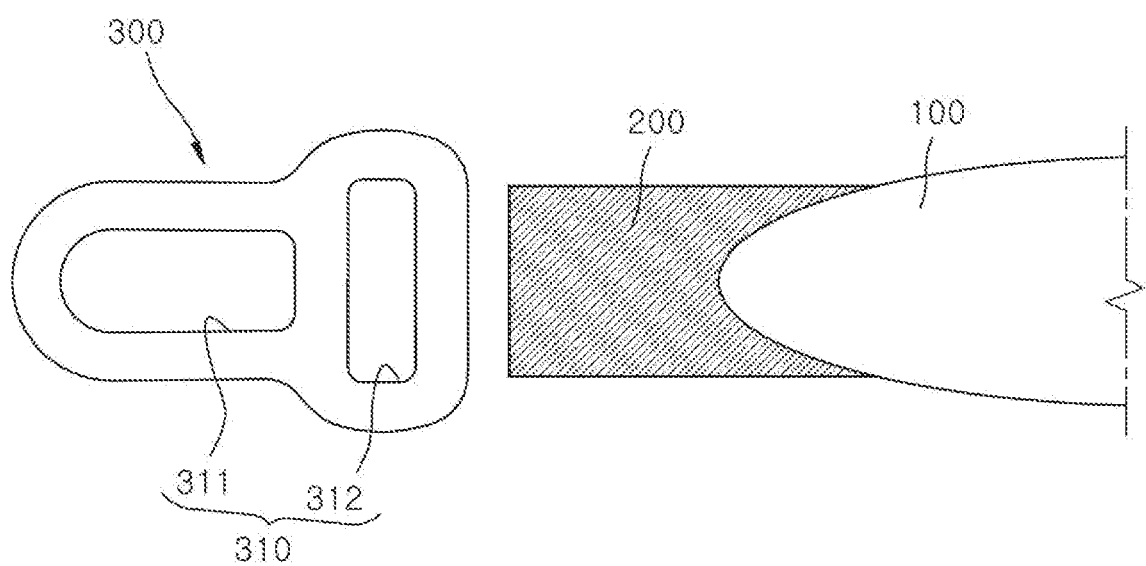
FIG. 5 illustrates a cushion, a tether and a steel tab of a roof airbag apparatus in accordance with a second embodiment of the present invention.
Figure 6:
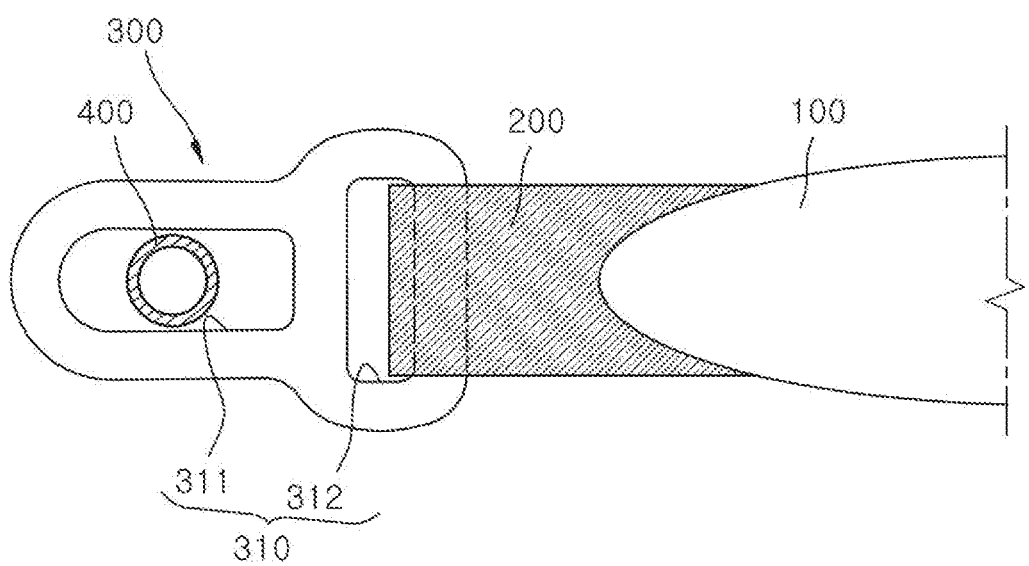
FIG. 6 illustrates that the cushion, the tether, the steel tab and a tether guide in the roof airbag apparatus in accordance with the second embodiment of the present invention are assembled to each other.
Figure 7:
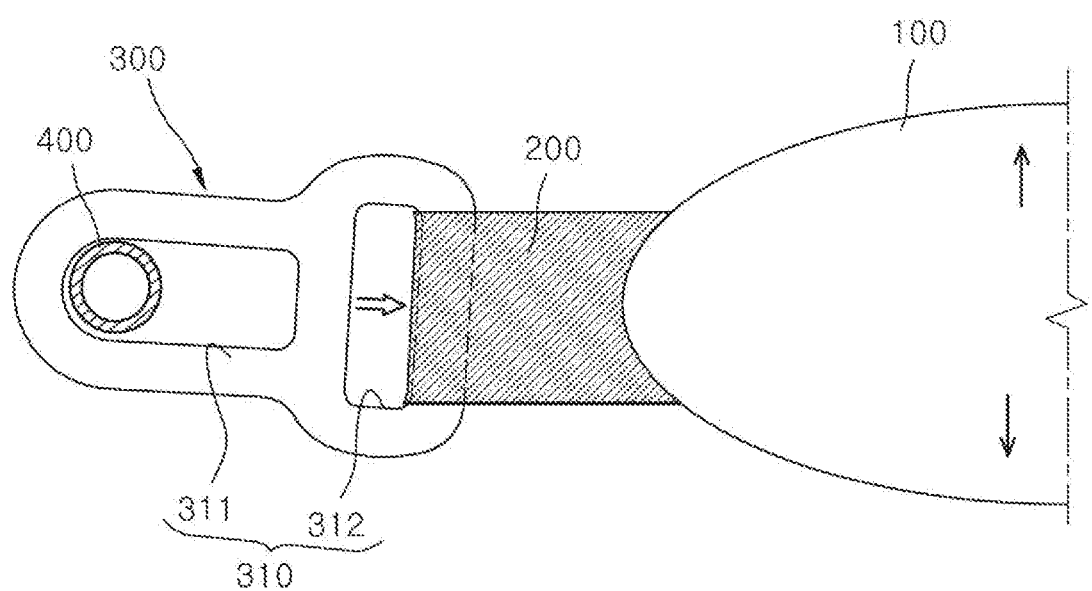
FIG. 7 illustrates that the tether is pulled by expansion of the cushion of the roof airbag apparatus in accordance with the second embodiment of the present invention.

FIG. 5 illustrates a cushion, a tether and a steel tab of a roof airbag apparatus in accordance with a second embodiment of the present invention, FIG. 6 illustrates that the is cushion, the tether, the steel tab and a tether guide in the roof airbag apparatus in accordance with the second embodiment of the present invention are assembled to each other, and FIG. 7 illustrates that the tether is pulled by expansion of the cushion of the roof airbag apparatus in accordance with the second embodiment of the present invention.

Next, the roof airbag apparatus in accordance with the second embodiment of the present invention will be described with reference to FIGS. 5 to 7. When the roof airbag apparatus in accordance with the second embodiment of the present invention is described, the description of the same components as those of the roof airbag apparatus of FIGS. 1 to 4 in accordance with the first embodiment of the present invention is omitted herein. The connection hole 310 may include a guide hole 311 and a tether hole 312. The tether guide 400 may be installed through the guide hole 311. The tether hole 312 may be arranged separately from the guide hole 311, and the tether 200 may be installed through the tether hole 312. Since the connection hole 310 includes the guide hole 311 and the tether hole 312, friction between the tether guide 400 and the tether 200 can be prevented while the tether guide 400 is returned to the original position when the cushion 100 is contracted.

The width of the guide hole 311 in the direction that the tether guide 400 is moved may be larger than the width of the guide hole 311 in a direction perpendicular to the direction that the tether guide 400 is moved. Therefore, when the steel tab 300 is pulled toward the cushion 100 by expansion of the cushion 100, the tether guide 400 can be prevented from being excessively pulled and bent, and tension applied to the tether guide 400 can be reduced.

The width of the tether hole 312 in the direction that the tether 200 is moved may be smaller than the width of the tether hole 312 in a direction perpendicular to the direction that the tether 200 is moved. The width of the tether hole 312 in the direction perpendicular to the direction that the tether 200 is moved may be equal to the width of the tether 200. Thus, since the movement of the tether 200 on the tether hole 312 is reduced, the steel tabs 300 can be arranged before the tether guide 400 is connected to the guide holes 311.

Figure 8:
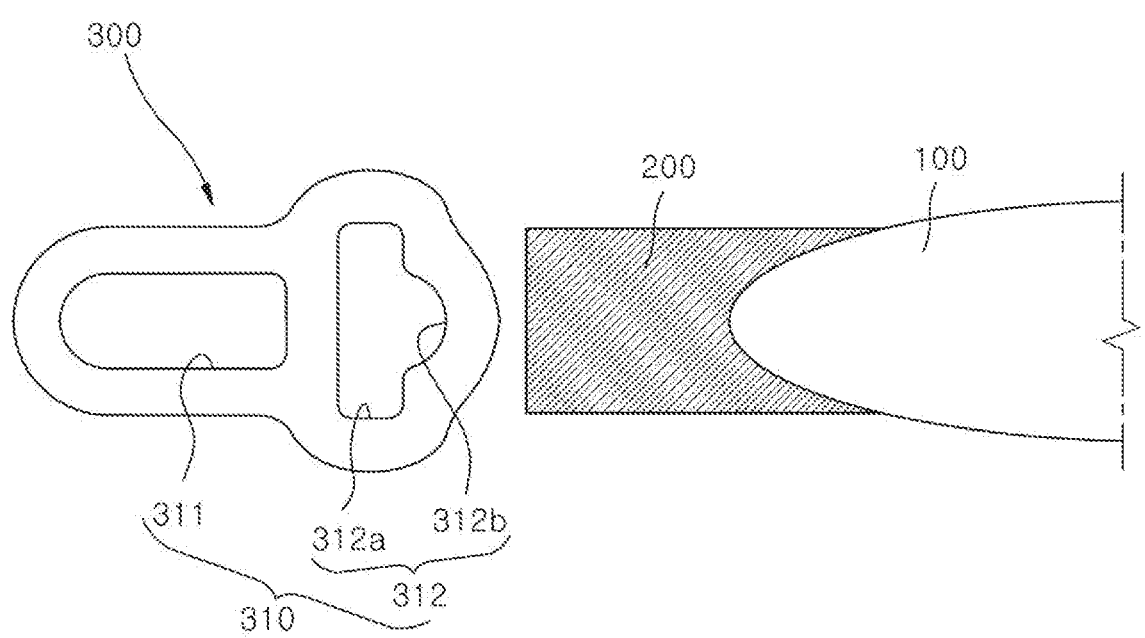
FIG. 8 illustrates a cushion, a tether and a steel tab of a roof airbag apparatus in accordance with a third embodiment of the present invention.
Figure 9:
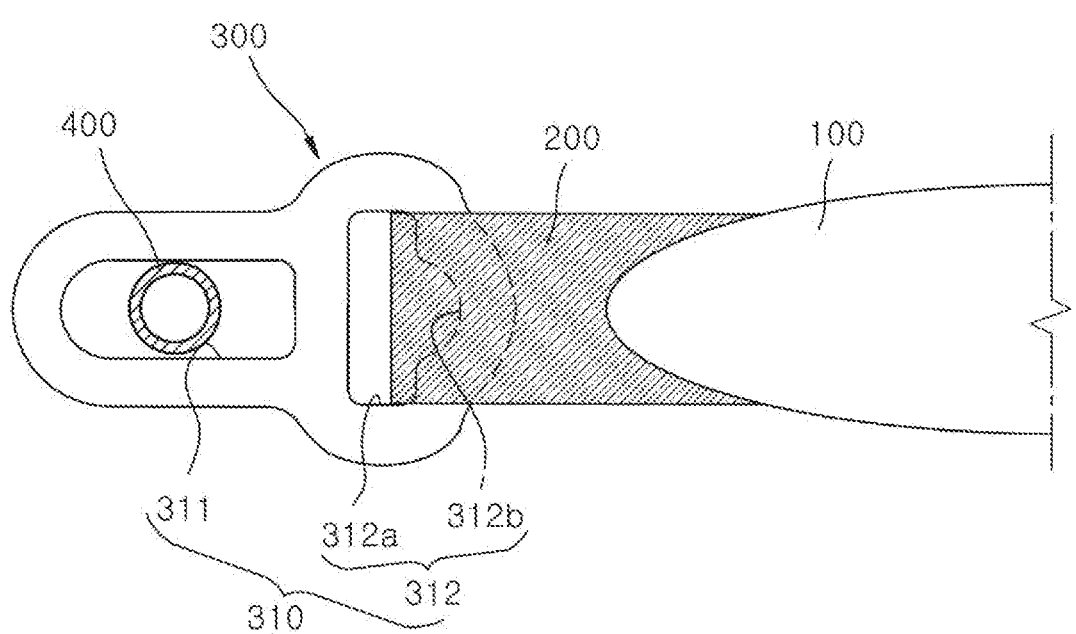
FIG. 9 illustrates that the cushion, the tether, the steel tab and a tether guide of the roof airbag apparatus in accordance with the third embodiment of the present invention are assembled to each other.
Figure 10:
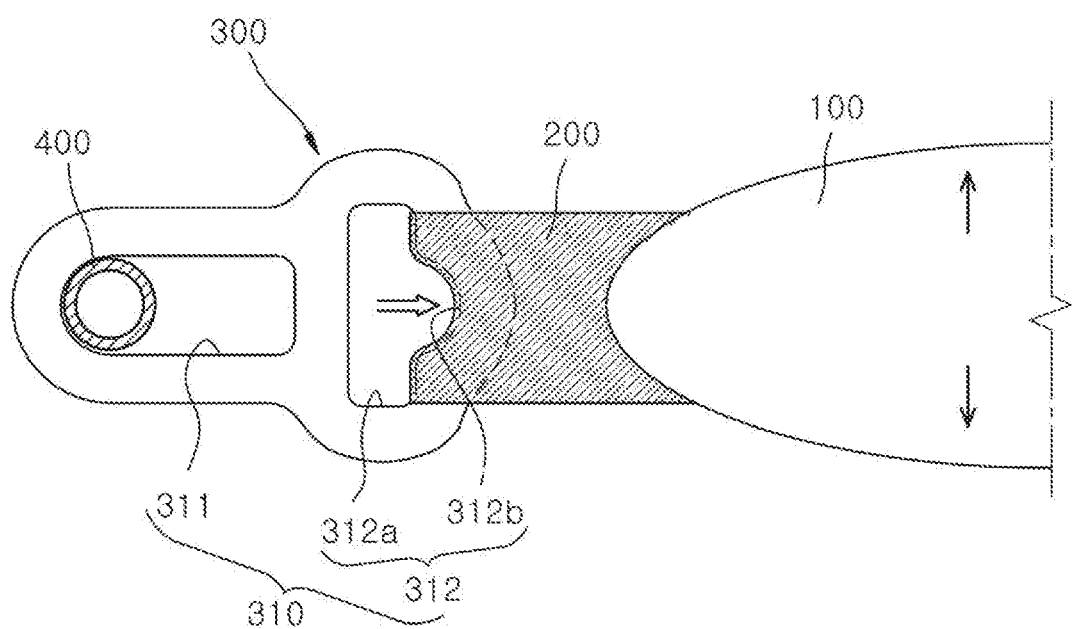
FIG. 10 illustrates that the tether is pulled by expansion of the cushion of the roof airbag apparatus in accordance with the third embodiment of the present invention.
Figure 11:
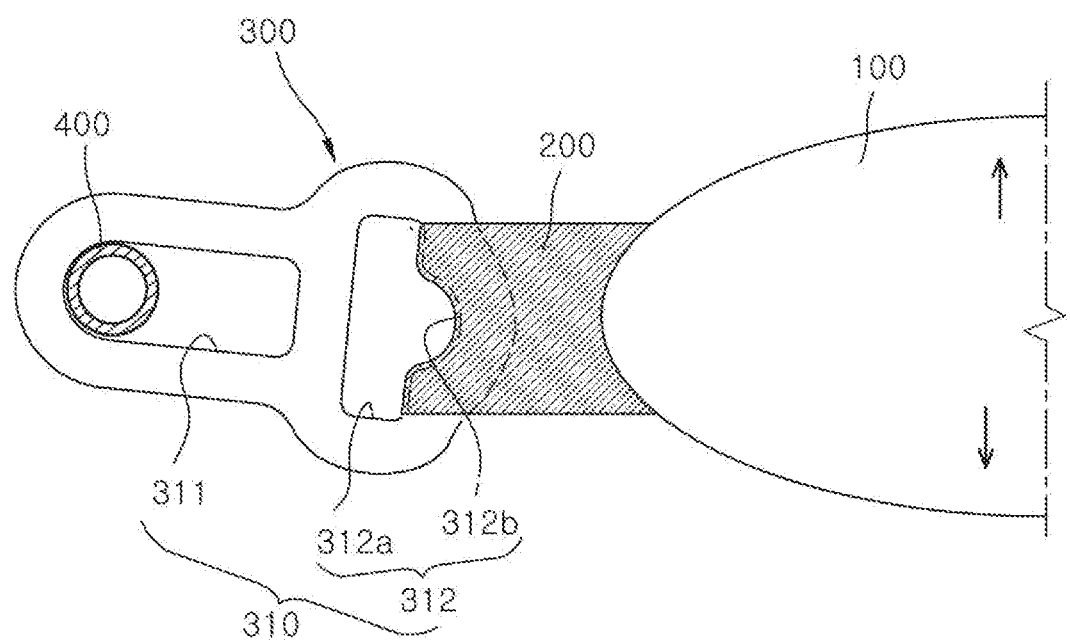
FIG. 11 illustrates that the steel tab is turned about the tether guide by expansion of the cushion in the roof airbag apparatus in accordance with the third embodiment of the present invention.

FIG. 8 illustrates a cushion, a tether and a steel tab of a roof airbag apparatus in accordance with a third embodiment of the present invention, FIG. 9 illustrates that the cushion, the tether, the steel tab and a tether guide of the roof airbag apparatus in accordance with the third embodiment of the present invention are assembled to each other, FIG. 10 illustrates that the tether is pulled by expansion of the cushion of the roof airbag apparatus in accordance with the third embodiment of the present invention, and FIG. 11 illustrates that the steel tab is turned about the tether guide by expansion of the cushion in the roof airbag apparatus in accordance with the third embodiment of the present invention.

Next, the roof airbag apparatus in accordance with the third embodiment of the present invention will be described with reference to FIGS. 8 to 11. When the roof airbag apparatus in accordance with the third embodiment of the present invention is described, the descriptions of the same components as those of the roof airbag apparatus of FIGS. 1 to 4 in accordance with the first embodiment of the present invention and the same components as those of the roof airbag apparatus of FIGS. 5 to 7 in accordance with the second embodiment of the present invention are omitted herein.

The tether hole 312 may include a first tether hole 312a and a second tether hole 312b. The tether 200 may be installed through the first tether hole 312a.

The second tether hole 312b may communicate with the first tether hole 312a, and the tether 200 may be inserted into the second tether hole 312b when the cushion 100 is expanded. When the cushion 100 is pulled as illustrated in FIGS. 10 and 11, the tether 200 may be inserted into the second tether hole 312b along the first tether hole 312a while pulled by the expansion of the cushion 100. Thus, tension applied to the tether guide 400 can be reduced.

The second tether hole 312b may have a smaller size than the first tether hole 312a. The second tether hole 312b may be formed in a round shape. Since the second tether hole 312b is formed in a round shape, the degree of freedom of the tether 200 may be increased. In this case, the steel tab 300 can be turned to reduce friction.

Figure 12:
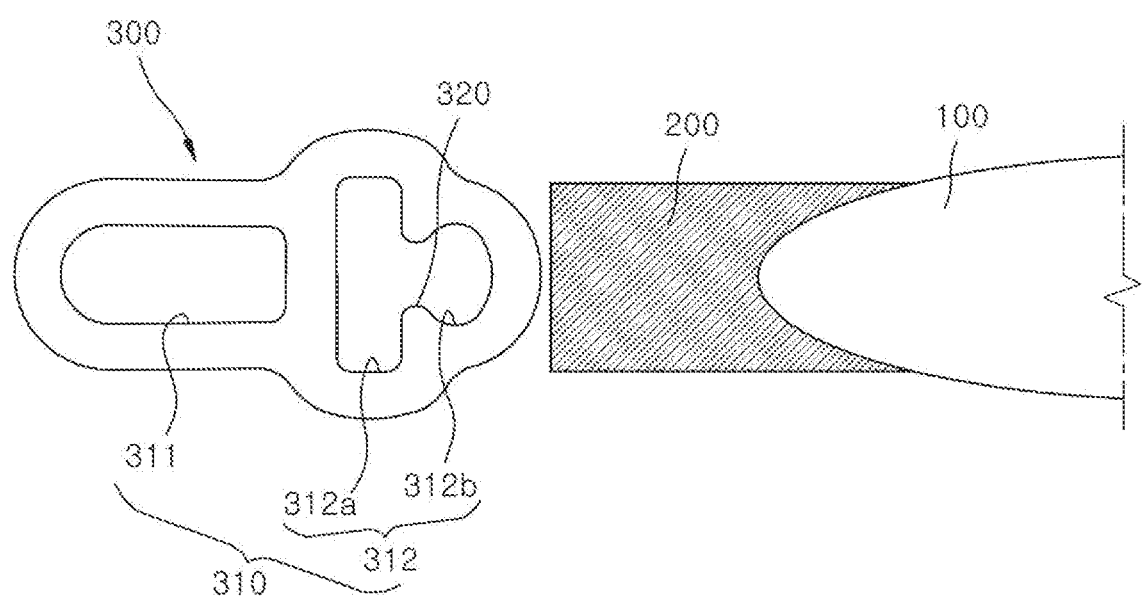
FIG. 12 illustrates a cushion, a tether and a steel tab of a roof airbag apparatus in accordance with a fourth embodiment of the present invention.
Figure 13:
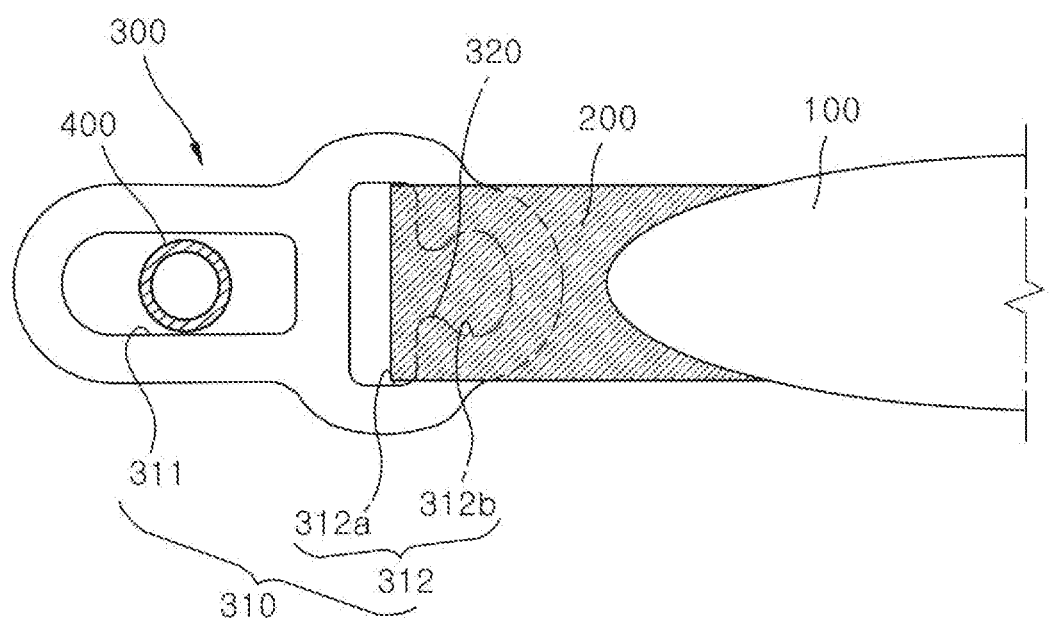
FIG. 13 illustrates that the cushion, the tether, the steel tab and a tether guide in the roof airbag apparatus in accordance with the fourth embodiment of the present invention are assembled to each other.
Figure 14:
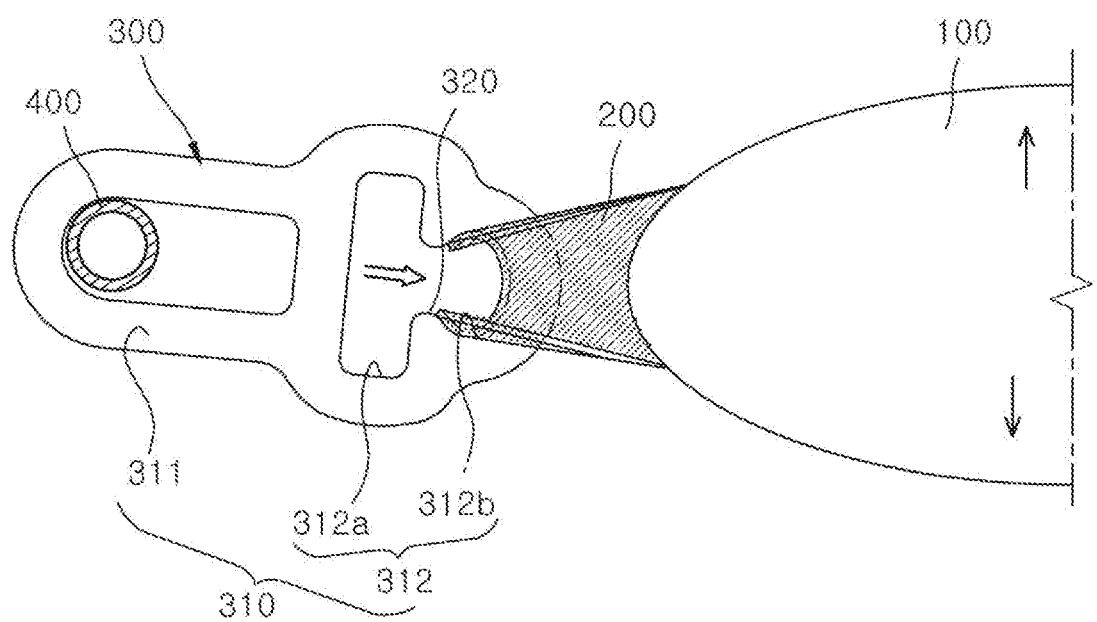
FIG. 14 illustrates that the tether is pulled by expansion of the cushion of the roof airbag apparatus in accordance with the fourth embodiment of the present invention.

FIG. 12 illustrates a cushion, a tether and a steel tab of a roof airbag apparatus in accordance with a fourth embodiment of the present invention, FIG. 13 illustrates that the cushion, the tether, the steel tab and a tether guide in the roof airbag apparatus in accordance with the fourth embodiment of the present invention are assembled to each other, and FIG. 14 illustrates that the tether is pulled by expansion of the cushion of the roof airbag apparatus in accordance with the fourth embodiment of the present invention.

Next, the roof airbag apparatus in accordance with the fourth embodiment of the present invention will be described with reference to FIGS. 12 to 14. When the roof airbag apparatus in accordance with the fourth embodiment of the present invention is described, the descriptions of the same components as those of the roof airbag apparatus of FIGS. 1 to 4 in accordance with the first embodiment of the present invention, the same components as those of the roof airbag apparatus of FIGS. 5 to 7 in accordance with the second embodiment of the present invention and the same components as those of the roof airbag apparatus of FIGS. 8 to 11 in accordance with the third embodiment of the present invention are omitted herein.

The second tether hole 312b may have protrusions 320 protruding to the inside thereof. When the cushion 100 is expanded as illustrated in FIGS. 13 and 14, the tether 200 may be pulled and inserted into the second tether hole 312b. Then, when the cushion 100 is contracted, the tether 200 may tend to move toward the first tether hole 312a while the force pulling the tether 200, i.e. the tension is released. However, the protrusions 320 may block the movement of the tether 200 toward the first tether hole 312a. Thus, it is possible to prevent a case in which the tether 200 is moved to the edge of the first tether hole 312a by the contraction of the cushion 100 and not moved toward the second tether hole 312b when the cushion 100 is expanded again.

In accordance with the embodiment of the present invention, since the tether guide is not directly connected to the tether but connected to the tether through the steel tab, the assembling performance of the cushion can be improved, and the steel tab can be turned while pulled toward the cushion when the cushion is expanded. Therefore, the roof airbag apparatus can reduce friction caused when the cushion is deployed.

Furthermore, since the tether guide is connected to the tether through the steel tab, the tether guide can be prevented from being excessively pulled and bent.

Furthermore, since the connection hole includes the guide hole and the tether hole, it is possible to prevent friction with the tether while the tether guide is returned to the original position when the cushion is contracted.

Furthermore, since the width of the tether hole in the direction perpendicular to the direction that the tether is moved is equal to the width of the tether, the movement of the tether on the tether hole can be reduced, which makes it possible to provide an effect that the steel tabs are arranged.

Furthermore, since the tether hole includes the first and second tether holes and the tether is inserted into the second tether hole along the first tether hole when the cushion is expanded, tension applied to the steel tab can be reduced.

Furthermore, since the second tether hole is formed in a round shape, the degree of freedom of the tether can be increased so that the steel tab is turned by itself. Thus, it is possible to reduce friction.

Furthermore, since the second tether hole has the protrusions formed toward the inside, the protrusions can prevent the tether from moving to the first tether hole, even though the force pulling the tether is released while the cushion is contracted.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A roof airbag apparatus comprising:
    a cushion comprises an inlet, gas discharged from an inflator is introduced through the inlet;
    a plurality of tethers connected to the cushion, and arranged along an edge of the cushion to be separated from each other;
    a plurality of steel tabs comprise a plurality of connection holes, each of the plurality of steel tabs comprises one of the plurality of connection holes formed therein; and
    a tether guide installed in a pillar shape through the plurality of connection holes, and supporting the cushion,
    wherein the plurality of tethers are connected to the cushion through the respective plurality of connection holes.

2. The roof airbag apparatus of claim 1, wherein each of the plurality of tethers is moved toward the cushion along the respective one of plurality of connection holes when the cushion is expanded, and pulls the tether guide.

3. The roof airbag apparatus of claim 2, wherein a width of the plurality of connection holes in a direction that the plurality of tethers are moved is larger than another width of the plurality of connection holes in another direction perpendicular to the direction that the plurality of tethers are moved.

4. The roof airbag apparatus of claim 1, wherein each of the plurality of connection holes comprises:
    a guide hole through which the tether guide is installed; and
    a tether hole disposed separately from the guide hole and having a tether of the plurality of tethers installed therethrough.

5. The roof airbag apparatus of claim 4, wherein a width of the guide hole in a direction that the tether guide is moved is larger than another width of the guide hole in a direction perpendicular to the direction that the tether guide is moved.

6. The roof airbag apparatus of claim 4, wherein a width of the tether hole in a direction that the tether is moved is smaller than another width of the tether hole in a direction perpendicular to the direction that the tether is moved.

7. The roof airbag apparatus of claim 4, wherein a width of the tether hole in the direction perpendicular to a direction that the tether is moved is equal to a width of the tether.

8. The roof airbag apparatus of claim 4, wherein the tether hole comprises:
    a first tether hole through which the tether is installed; and
    a second tether hole which communicates with the first tether hole, and the tether is inserted into the second tether hole when the cushion is expanded.

9. The roof airbag apparatus of claim 8, wherein the second tether hole has a smaller size than the first tether hole.

10. The roof airbag apparatus of claim 8, wherein the second tether hole is formed in a round shape.

11. The roof airbag apparatus of claim 8, wherein the second tether hole comprises protrusions formed toward the inside.

* * * * *